Dec. 10, 1968  J. P. FRASER  3,415,573
METHOD OF SULFUR RECOVERY FROM SULFUR-CONTAINING
HYDROGEN SULFIDE RICH FORMATIONS
Filed Aug. 22, 1966  4 Sheets-Sheet 1

INVENTOR:
JOHN P. FRASER
BY:
HIS AGENT

INVENTOR:
JOHN P. FRASER

BY: *[signature]*

HIS AGENT

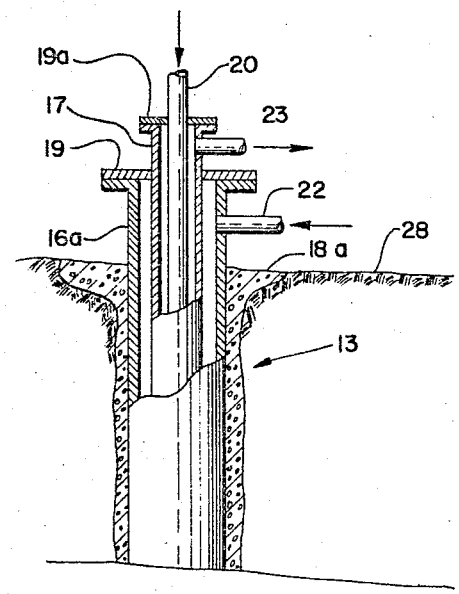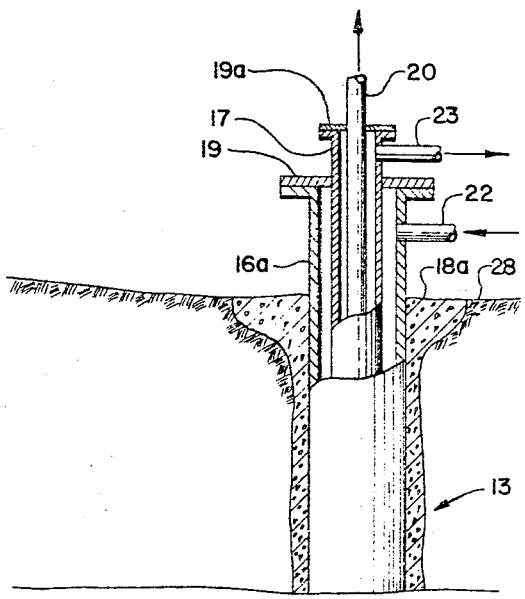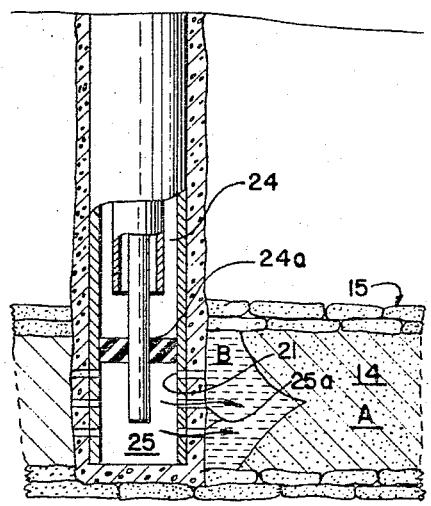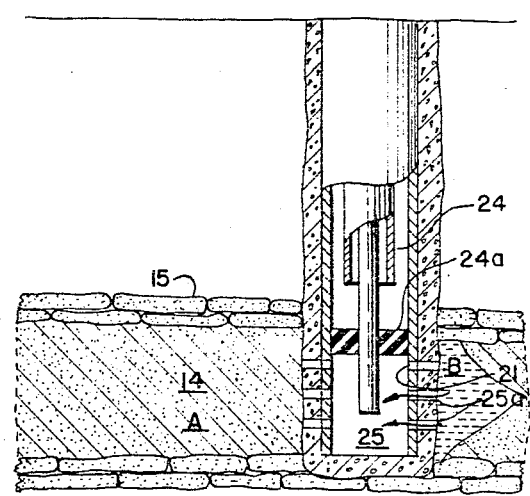
FIG. 6                    FIG. 7
INVENTOR:
    JOHN P. FRASER
BY:
    HIS AGENT United States Patent Office 3,415,573
Patented Dec. 10, 1968

3,415,573
METHOD OF SULFUR RECOVERY FROM SULFUR - CONTAINING HYDROGEN SULFIDE RICH FORMATIONS
John P. Fraser, Houston, Tex., assignor to Shell Oil Company, New York, N.Y., a corporation of Delaware
Filed Aug. 22, 1966, Ser. No. 573,960
5 Claims. (Cl. 299—4)

ABSTRACT OF THE DISCLOSURE

A method of recovering sulfur from an underground formation containing sulfur-hydrogen sulfide rich hydrocarbons, without plugging the formation or equipment used in the process, by means of a miscible driving fluid injected into the formation through a well at elevated temperature and pressure and recovering the sulfur-containing hydrocarbon from the well and thereafter separating the sulfur from the hydrocarbon.

---

The invention relates to the recovery of sulfur from underground formations having reservoirs of fluids which are high in hydrogen sulfide and also containing sulfur, hydrocarbons and moisture. More particularly, the invention is directed to recovery of sulfur from underground formations in which a substantial amount of sulfur is either present as elemental, solid sulfur in the pores of the reservoir formation or is dispersed in hydrogen sulfide and some hydrocarbon and wherein the hydrogen sulfide content is above 30% and generally between 70 and 95% of the total fluid content, the sulfur dispersed in said fluid being recovered without depositing in the pores of the reservoir formation thereby reducing its permeability or plugging the production tubing string of the producing well.

In underground reservoirs which contain hydrocarbon fluids of high hydrogen sulfide content (30–95%) and elemental sulfur dispersed therein, the recovery of such a fluid becomes difficult due to the tendency of the sulfur to come out of solution as the production fluid flows through the formation into the production well bore and up the production tubing string due to pressure and temperature decreases in the production reservoir and production well due to reduction of static head in the fluid column and cooling as the fluids near the surface of the ground. As the pressure and temperature decrease in such systems, the solubility of the sulfur in the hydrogen sulfide containing fluid decreases, resulting in the reduction in permeability of the formation due to sulfur plugging and also the sulfur tends to deposit in the production tubing string causing further reduction in fluid recovery and in some cases the stoppage of recovery of sulfur and other fluid components from the reservoir. Where moisture and carbon dioxide are present in recovering sulfur-containing hydrogen sulfide fluid under discussion, the problem becomes even more complicated, for hydration also occurs and the hydrate formations tend to further plug the tubing string.

An object of the present invention is the recovery of producing fluids from underground formations which fluids are hydrogen sulfide rich hydrocarbons containing sulfur. Still another object of the present invention is to prevent plugging of the tubing string in the production well by sulfur and hydrate formations. Still another object of the present invention is to recover sulfur from underground sulfur-containing hydrogen sulfide rich hydrocarbon reservoirs. Another object of the present invention to separate sulfur above ground from the other components of the recovery fluid, namely the hydrocarbon and hydrogen sulfide, for further refining and processing. Still other objects of the present invention will be apparent from the description of the present invention.

Broadly stated, the invention resides in the recovery of sulfur and other components present in underground production reservoirs rich in sulfur-containing hydrogen sulfide hydrocarbons without plugging the production formation or tubing string by injecting into the production zone under elevated pressure and temperature a miscible driving liquid or fluid preferably under pressure which is capable of maintaining the pressure-temperature conditions in the production zone at such a level as to keep the sulfur in solution in the hydrogen sulfide-hydrocarbon producing fluid as it flows from the production zone upward through the tubing string of the production well. As the producing fluid flows upwardly through the tubing string, heating means may be provided to maintain the temperature of the sulfur-containing fluid sufficiently high so as to prevent deposit of sulfur on the walls of the tubing string prior to being recovered in a recovery plant.

Particularly effective driving, forcing or sweeping miscible fluids which are injected under pressure into the recovery fluids in the production zone in order to maintain desired pressure-temperature conditions in the production zone so as to maintain the sulfur in a flowable solution state for easy and effective recovery, can be obtained from the fluid components recovered from the producing zone such as compressed hydrogen sulfide or hydrogen-sulfide hydrocarbon mixtures. Fluids of this type when reinjected under pressure into the producing zone have several advantages such as they are readily available, they are cheap, they are capable of maintaining the desired pressure in the production zone, and above all are effective solubilizers for sulfur in the production reservoir zone. However, other miscible driving solvent fluids can be used wholly or in part for the sulfur-free fluids recovered from the production zone and include aromatic or aliphatic hydrocarbons such as benzene, toluene, propane, butane, etc., ammonia, carbon disulfide, sulfur monochloride and the like, provided they are miscible with the recovery fluid and are effective solubilizers for sulfur and can maintain the necessary pressure-temperature relation in the production zone so as to keep the recovery fluid in a flowable state and prevent the sulfur or hydrate formations from plugging any part of the system. The amount of compressed sulfur-free hydrogen sulfide injected into the production zone should be sufficient to maintain the pressure in the production zone at a level so that the sulfur present in said production zone is kept in solution and in a flowable state. This generally depends on the sulfur and hydrogen sulfide content of the production zone fluid and the pressure and temperature in said zone. Generally, for sulfur-containing fluids having a hydrogen sulfide content of 50–95%, the driving hydrogen-sulfide fluid should be injected under pressure and under conditions as to maintain in the production zone a minimum pressure of, for example, about 1250 p.s.i. at 200° F., or 750 p.s.i. at 150° F. In case substantially sulfur-free hydrogen sulfide fluid is used as the driving injecting fluid the amount of sulfur in such fluids can be determined by reference to FIGURE 4 which shows the solubility of sulfur at different pressures and temperatures in a reservoir fluid containing about 80% hydrogen sulfide and if the reservoir fluid is initially saturated with elemental sulfur, then the amount of sulfur which will precipitate in the tubing string can be determined by the graph curves shown in FIGURE 5 when the wellhead is kept at 2000 p.s.i. and 100° F.

As pointed out previously sulfur does not only tend to cause plugging of the formation but also causes sulfur plugging in the tubing string as it flows from the production zone up the tubing string as the temperature and pressure decrease. To prevent this it may be desirable to maintain the temperature in the tubing string at above 100° F. and to accomplish this a hot fluid can be circulated around the outside circumference of the production tubing string. Also by doing this hydration formation is minimized. However, if ammonia is used as the driving injection fluid, heating of the annulus between the inner producing well casing and the tubing string is not necessary since the solubility of sulfur in ammonia increases as the temperature decreases in such fluid mixtures. For solvents such as hydrogen sulfide, in which the solubility of sulfur increases with increasing temperature, the solvent may be forced down through the casing-tubing annulus to mix with and dilute the produced fluids, thus preventing separation and deposition of sulfur.

The sulfur can be recovered above ground by various means. Thus, one method for the recovery of sulfur from sulfur-containing hydrogen sulfide rich hydrocarbons is to discharge the hot fluid as it comes from the production tubing string into a valved flowline into which hot water and/or steam is injected and the mixture introduced into a separator where liquid sulfur is removed, and the aqueous hydrogen sulfide fluid is piped to a separator where the water is removed, heated and reintroduced into the sulfur-containing fluids. The hydrocarbon and hydrogen sulfide are separated by suitable means and the hydrogen sulfide is compressed, cooled and reinjected into the injection well to function as a sulfur solubilizer and miscible driving or sweeping fluid in the production zone.

Another method for recovering sulfur above ground can be accomplished by piping the sulfur-containing hydrogen sulfide fluid from the tubing string into a heater so as to maintain the fluid in a liquid state and the hot fluid can be forced into a cyclone separator where liquid sulfur is recovered and the hydrogen sulfide-hydrocarbon fluid is sent to a scrubber where it is scrubbed with conventional scrubbing liquids such as aqueous amine solutions, e.g. aqueous ethanolamine solution to remove the hydrocarbons from hydrogen sulfide and the fluid sent to a flasher to separate the scrubbing solution from hydrogen sulfide which is then wholly or in part used as the driving injection fluid as described above.

The accompanying drawings are supplied for the purpose of illustrating and not limiting the invention.

FIGURES 6 and 7 show the use of a single well recovery system.

Figure 1:
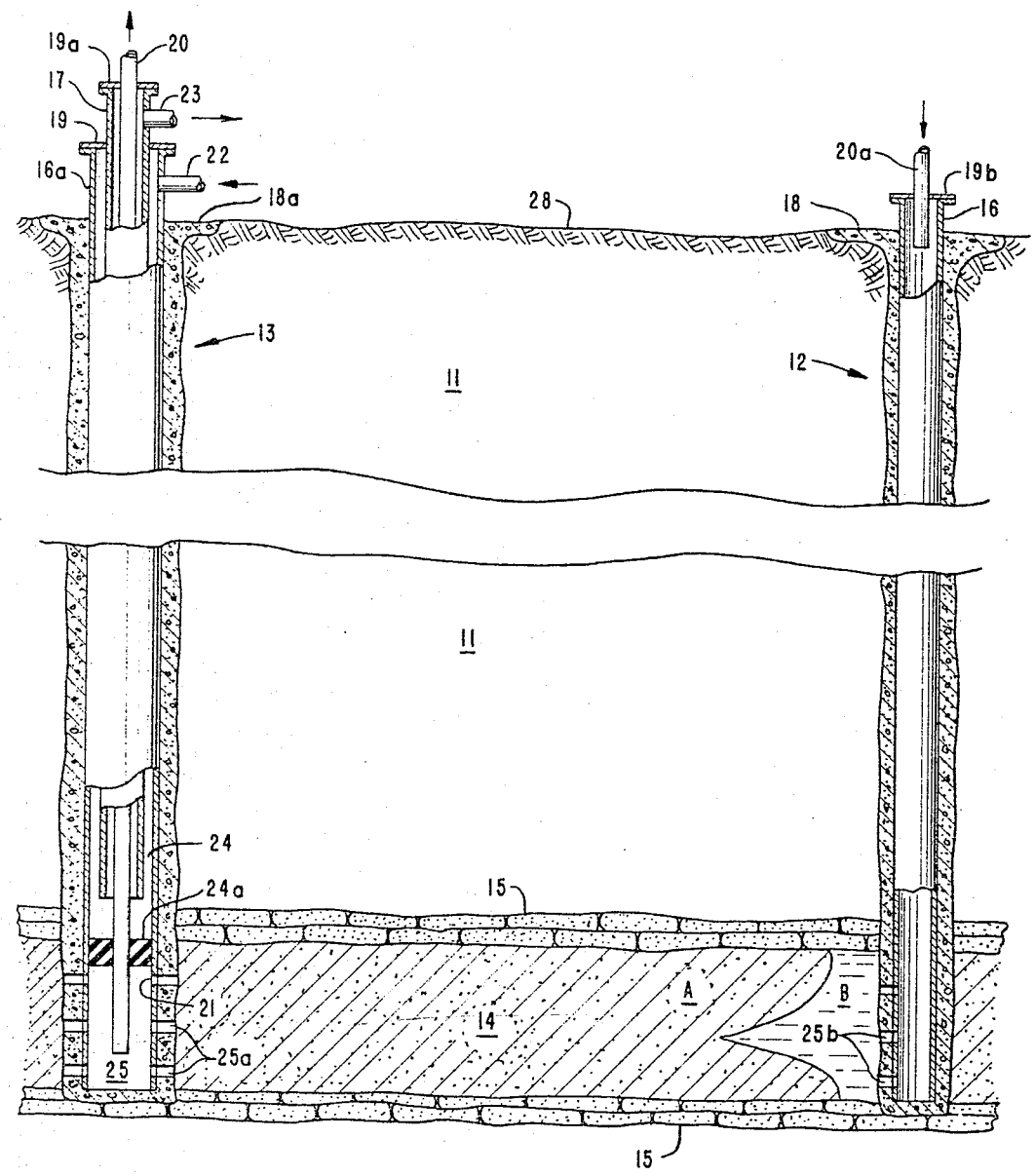
FIGURE 1 shows a vertical section of a production well and FIGURES 2 and 3 show flow diagrams of recovery operation of the various components obtained from the production well of FIGURE 1.

With reference to FIGURE 1, there is shown a vertical section of strata 11 penetrated by a pair of spaced well bores, e.g., an injection well 12 and a producing well 13 which pass into or through producing zone 14. The producing zone 14 lies between two vertically-spaced impermeable or impervious layers of strata 15 and 15a. The producing zone 14 is not limited to being sandwiched between spaced layers of impermeable strata 15 but may be contained by other types of layers which form effective confining barriers for the producing zone 14.

Two well bores 12 and 13 of typical well bore construction are shown having well casings 16 and 16a positioned in the bores and the annular space sealed by cement 18 and 18a which will usually occupy at least the lowermost 1000 to 2000 feet of the annular space. Producing well casing 16a is closed with gland 19 provided with an inner casing 17 which is closed by gland 19a provided with a production tubing string 20 passing through casing 17 and extending downwards into producing zone 14. Injection casing 16 is also enclosed with gland 19b provided with injection tubing string 20a also extending downwards into producing zone 14. Production casing 16a and inner casing 17 are provided with lines 22 and 23, respectively, for circulating hot fluids in chamber 24 which is formed by placing packer 24a in the annulus formed by casing 16 and tubing string 20, packer 24a being positioned between ports 21 of casing 16 and the bottom opening of casing 17. The bottom of tubing string opening 20 passing through casing 17 is positioned in chamber 25 formed by packer 24a and a mechanical closure over the lower end of the casing, which chamber 25 is provided with ports 25a to allow producing fluid from zone 14 to enter up through tubing string 20. In injection casing 16 the injection tubing string 20a extends into producing zone 14 and the section of injection casing 16 in the producing zone 14 is provided with ports 25b for passage of driving injection fluids into producing zone 14.

Figure 2:
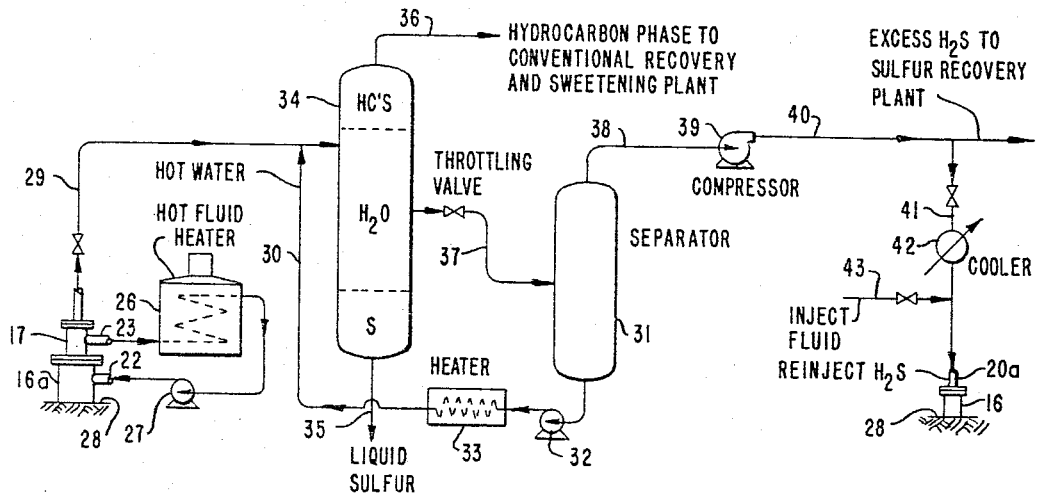
Figure 3:
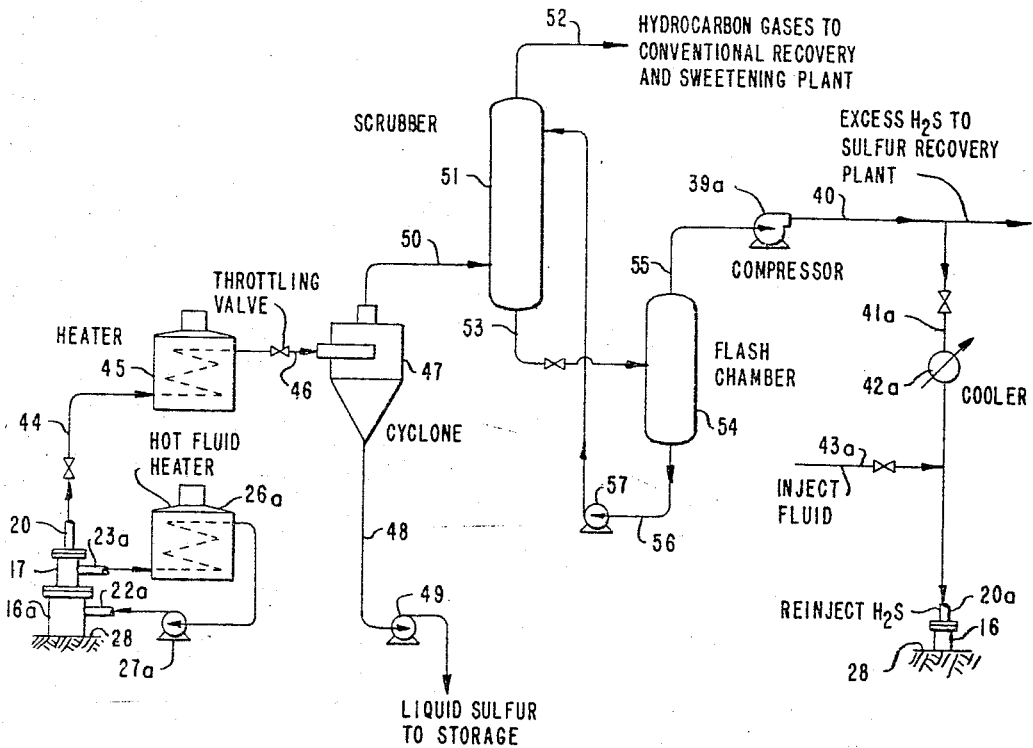
Figure 4:
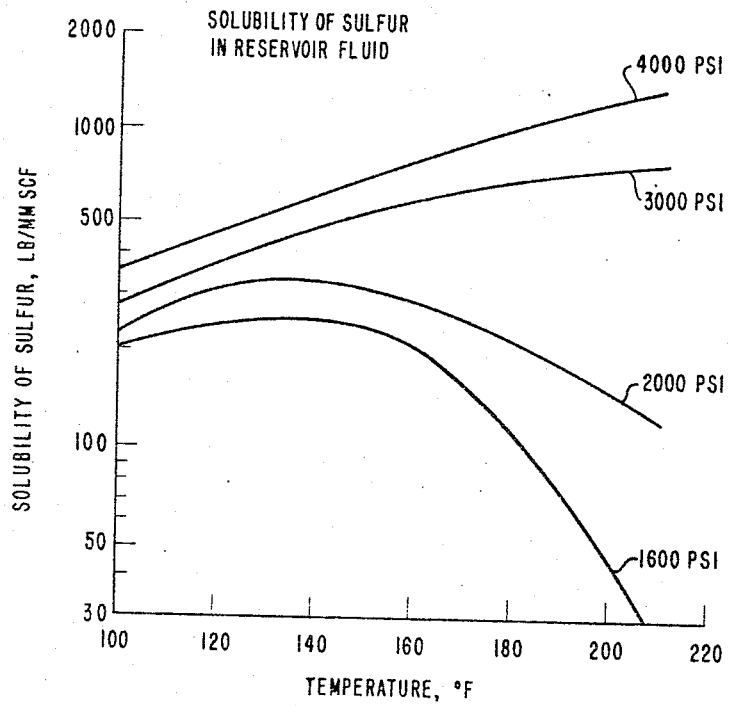
FIGURES 4 and 5 show graphs of the solubility of sulfur in reservoir fluid and of the amount of sulfur precipitation in the tubing string, respectively.
Figure 5:
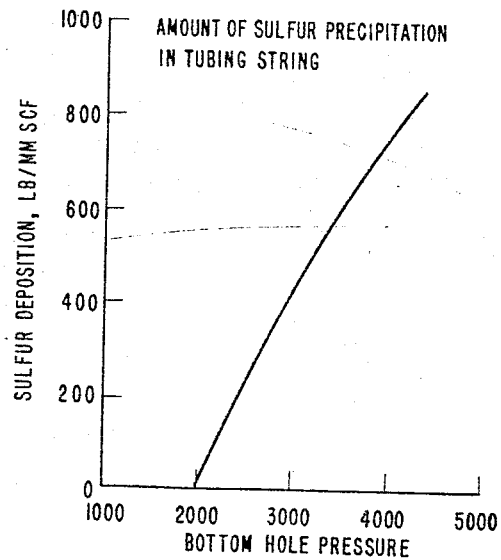

In order to better understand the invention the producing zone 14 between the injection well 12 and production well 13 is divided into zone A which comprises the recovery composition of the producing zone 14 and which is forced into chamber 25 through ports 25a and 21 up the tubing string 20 to the recovery plants shown in FIGURES 2 and 3 and zone B is the driving injection fluid which is miscible with the production recovery components of zone A.

The sulfur-containing fluid recovered from zone 14 through production well 13 flows up tubing string 20 to valved line 29 and the sulfur, sour hydrocarbon and hydrogen-sulfide are recovered above ground level 28 by various means as illustrated by FIGURES 2 and 3.

In FIGURES 2 and 3 the production fluid remains in flowable form within tubing string 20 without depositing sulfur and possibly hydrates on the tube walls thereby causing plugging of the tubing string 20 by circulating from heater 26 hot fluids into chamber 24, by injecting the hot fluid which may be hot oil through line 22 provided with pump 27 connected to casing 16a and which leaves chamber 24 through line 23 connected to casing 17 and enters heater 26 for the recycling process through chamber 24. The circulating fluid temperature in chamber 24 should be sufficiently high to keep the producing fluids as they pass up through tubing string 20 in a fluid state so as to prevent precipitation of sulfur and hydrates in the tubing string 20. This temperature is generally above 100° F.

The production fluid flowing through tubing string 20 enters valved line 29 into which is injected hot water and/or steam from line 30 which is obtained from separator 31 and is pumped therefrom by means of pump 32 and is heated prior to being injected into line 29 by heater 33. The mixture of production fluid and hot water enters separator 34 wherein the mixture is cooled to allow separation of liquid sulfur which is recovered from line 35. The hydrocarbon components are removed through line 36 and processed by conventional means not shown for recovery and sweetening. The water phase of the mixture which contains hydrogen sulfide is removed from separator 34 through throttling valve line 37 to separator 31 where the water is removed through line 30 and the hydrogen sulfide removed through line 38 connected to compressor 39. The compressed hydrogen sulfide is removed to a recovery plant through valved line 40 where a portion of the hydrogen sulfide if desired is converted to sulfur or other products such as carbon disulfide and the like by means well known to the art. Another portion of the hydrogen sulfide if desired is by-passed into valved line 41, passed through cooler 42, and the liquefied hydrogen sulfide under pressure is injected into tubing string 20a in injection casing 16 into production zone 14 through ports 25b to form a miscible driving or sweeping fluid zone B which aids in maintaining the desired pressure and temperature in zone 14 for continued production and recovery of sulfur, hydrogen sulfide and hydrocarbons from producing zone 14 as shown in FIGURE 1. Instead of using as the injection sweeping or driving fluid compressed hydrogen sulfide as recovered from the producing zone 14, the entire recovered hydrogen sulfide can be passed through line 40 to the sulfur recovery plant and another miscible fluid such as ammonia, carbon disulfide, sulfur monochloride, and/or miscible aliphatic or aromatic hydrocarbon solvents, e.g., propane, butane, benzene and/or toluene, can be used as injecting fluids and injected into injection tubing string 20 through line 43 into the producing zone 14 to form the miscible sweeping fluid zone B. These fluids must be miscible with the production composition present in zone 14 and be capable of maintaining the sulfur in solution or suspension at the pressure and temperature of the producing zone 14.

FIGURE 3 illustrates another method for recovery of the production components as they are obtained from producing zone 14 and flow up production string tube 20. The production fluids in tubing string 20 are kept hot and fluid by heater means 26a with the aid of chamber 24 formed in the annulus of casings 16a and 17 and lines 22a and 23a and pump 27a as described in FIGURE 2. The production fluid from tubing string 20 enters valved line 44 into heater 45 where the sulfur, hydrates and other components which tend to come out of solution are kept fluid and in a dispersed state. The heated fluid passes through throttling valved line 46 into a cyclone separator where the liquid sulfur is thrown out of solution and is removed through line 48 with aid of pump 49 in line 48. The hydrocarbons and hydrogen sulfide are removed from the cyclone 47 through line 50 into scrubber 51 where the fluid is scrubbed by conventional means such as treating with aqueous amine solutions to remove acid gases from the gases, which gases are removed through line 52 for conventional processing such as sweetening and the acid gases are removed through valved line 53 into a flash chamber 54 where hydrogen sulfide is passed through line 55 and processed as shown by reference to parts 39a, 40a, 41a, 42a and 43a corresponding to FIGURE 2 to parts 39 to 43, respectively.

The scrubbing solution is pumped through line 56 with the aid of pump 57 into scrubber 51. Conventional modifications in the recovery of sulfur, hydrogen sulfide and hydrocarbons as shown in FIGURES 2 and 3 can be resorted to without departing from the spirit of the present invention.

The present invention for recovering sulfur may use more than one production well and more than one injection well, which injection wells can use the same or different driving injection fluids such as hydrogen sulfide and carbon disulfide, provided said fluids are miscible with each other and with the production fluids in the reservoir and are effective sulfur solubilizers. The present invention for recovering sulfur may also use a single well as shown in FIGURES 6 and 7 wherein the numerals in the figures correspond to the numerals of FIGURE 1 which is alternately used for injection of the sulfur solubilizing fluid such as hydrogen sulfide or ammonia and for production of the sulfur-rich fluids from the reservoir.

I claim as my invention:

1. A process of recovering sulfur from a production zone of an underground formation containing sulfur in 30–95% hydrogen sulfide rich hydrocarbon fluid, part of the sulfur being in solution and part being dispersed as free elemental sulfur, said formation being penetrated by an injection well and a production well which are in communication, without plugging the formation and equipment used in the process, the steps comprising:

(a) injecting through the injection well and into the production zone a sulfur-free miscride driving fluid with the sulfur-containing fluid at the pressure and temperature existing in the production zone of the formation;

(b) driving the sulfur-containing fluid with the aid of said sulfur-free miscible driving fluid from the vicinity of the injection well towards the production well and into said production well and up a tubing string;

(c) maintaining the sulfur-containing fluid in the tubing string at above 100° F. to prevent precipitation of sulfur on the interior wall of the tubing string; and, (d) separating and recovering above ground the sulfur from the hydrogen sulfide rich hydrocarbon fluid.

2. The process of claim 1 wherein the injection fluid is substantially sulfur-free hydrogen sulfide obtained from the sulfur-containing production fluid after the sulfur and hydrocarbons have been separated therefrom and containing substantially no dissolved sulfur and the hydrogen sulfide is recycled into the underground formation under pressure through the injection well at a minimum pressure of 1500–1700 p.s.i. and the temperature of the tubing string is maintained above 100° F. by circulating hot oil around the outside of the tubing string.

3. The process of claim 1 wherein the sulfur is separated above ground from the sulfur-containing production fluid by mixing the fluid with hot water thereby causing separation of the sulfur from the hot water and the remaining components of the fluid.

4. The process of claim 1 wherein the miscible driving fluid is substantially sulfur-free compressed hydrogen sulfide fluid.

5. The process of claim 4 wherein the sulfur-free compressed hydrogen sulfide is maintained at the same pressure and temperature as in said production zone and the temperature of the fluid in the production tubing string is maintained above 100° F. by circulating hot fluid around the outside of the tubing string.

References Cited

UNITED STATES PATENTS

| | | | |
|---|---|---|---|
| 461,431 | 10/1891 | Frasch | 299—5 |
| 738,326 | 9/1903 | Higgins | 299—4 |
| 2,896,931 | 7/1959 | Marquis | 299—4 |
| 2,941,783 | 6/1960 | Stinson | 175—66 X |
| 2,991,987 | 7/1961 | Heinze | 299—4 X |
| 3,236,564 | 2/1966 | Edmonds et al. | 299—4 |

JAMES A. LEPPINK, *Primary Examiner.*

I. A. CALVERT, *Assistant Examiner.*

U.S. Cl. X.R.

299—5, 7; 166—11